Oct. 9, 1956   W. E. WOODSON, JR., ET AL   2,766,447
VISUAL IN-LINE MULTI-SYMBOL SIGNAL INDICATOR
Filed July 7, 1954

*INVENTOR.*
WESLEY E. WOODSON, JR
BY  JACK I. MORGAN

George E. Pearson
ATTORNEYS

United States Patent Office 2,766,447
Patented Oct. 9, 1956

2,766,447

VISUAL IN-LINE MULTI-SYMBOL SIGNAL INDICATOR

Wesley E. Woodson, Jr., El Cajon, and Jack I. Morgan, San Diego, Calif.

Application July 7, 1954, Serial No. 441,956

9 Claims. (Cl. 340—380)

(Granted under Title 35, U. S. Code (1952), sec. 266)

The invention described herein may be manufactured and used by or for the Government of the United States of America for governmental purposes without the payment of any royalties thereon or therefor.

The present invention relates to a visual in-line multi-symbol signal indicator and more particularly to a multi-symbol signal indicator for decimal digits 0 through 9, which will present visual information from high speed computers and which requires no more frontal space than that taken up in displaying any one of the symbols. The indicator device consists of a number of superimposed thin laminated plates of transparent material having a marked ability to internally reflect light which has entered the material. Each lamination is inscribed with a line in the shape of the symbol to be displayed and has a separately energized source of light suitably arranged to efficiently transmit light into the transparent laminated plate. Light within the lamination is scattered at the inscribed surface which shows up as an illuminated symbol. Each light source may be connected to a different circuit to show which circuit is in operation or switching means may be used to connect the desired light and illuminate its corresponding symbol.

The present invention comprises a visual in-line multi-symbol indicator which will accept impulses as fast as they are fed and transforms them to current that lights individual numbers or symbols on individual plastic plates stacked behind each other so that a person viewing them can see any one of the lighted plates at a time. Stacking the plates make it possible for all numbers or symbols to appear at the same place instead of requiring the observer to hunt for the lighted number from numbers placed in long columns or rows. The numerals always appear in the same place insofar as the observer is concerned and this, in turn, eliminates reversal reading errors frequently encountered with column type indicators. The indicator of the present invention requires low alternating current switching and is inherently rugged and reliable in operation.

An object of the present invention is the provision of a visual in-line multi-symbol signal indicator which will operate at high rates of speed in accepting impulses and effecting an illuminated symbol display.

Another object is the provision of a multi-symbol indicator in which all symbols are stacked to permit all illuminated numbers to appear at the same place.

Another object is the provision of a high speed multi-symbol indicator sturdy and compact in construction, dependable in operation and which may be easily and inexpensively manufactured.

Another object is the provision of an indicator having a single position for appearance of the symbols to eliminate confusion and reversal reading errors which occur in other types of indicators.

Other objects and many of the attendant advantages of this invention will be readily appreciated as the same becomes better understood by reference to the following detailed description when considered in connection with the accompanying drawings wherein.

Figure 1:
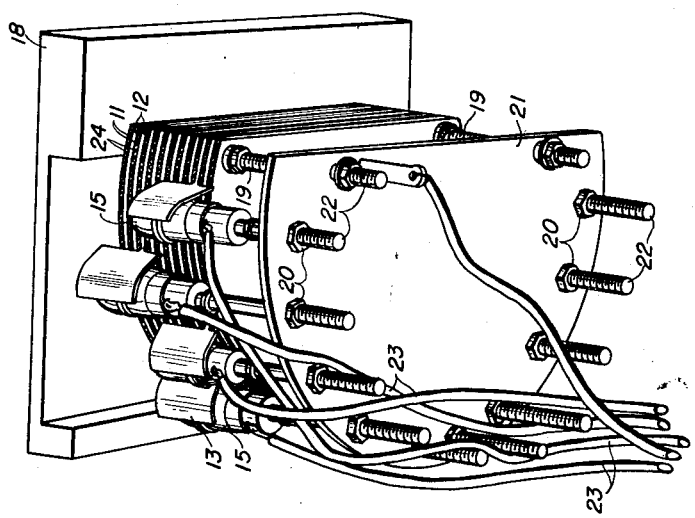
Fig. 1 shows a pictorial view of the indicator from the bottom and to the rear.

Referring now to the drawings wherein like reference characters designate like or corresponding parts throughout the several views, there is shown in Fig. 1 a rear bottom view of the indicator. The indicator comprises a plurality of thin stacked laminated plates 11 of transparent material, such as Lucite, which will internally reflect light that has entered the material. Each plate is inscribed with a numeral and is masked around its edge with suitable masking material 24 to minimize light transmission from one light source to an adjacent plate and to minimize light entry into any plate from the outside. The adjacent plates are separated from each other by shields 12. Plates 11 have an ear 13 projecting outwardly from the edge thereof at a point on its circumference from which a light source mounted therein will emit light through the plate, cutting the maximum number of lines in the inscribed numeral.

Figure 2:
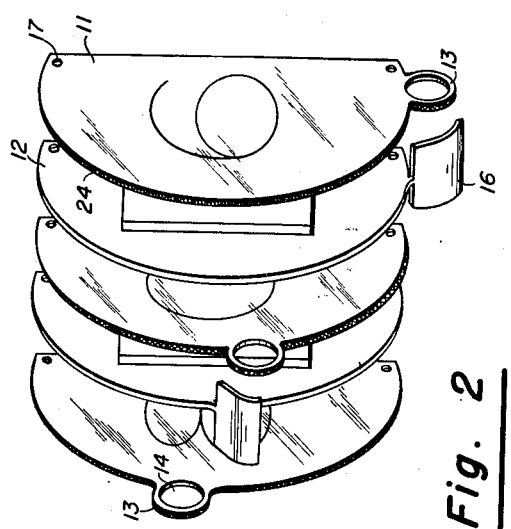
Fig. 2 is an exploded view showing the relationship of the plates and shields before assembly.

As shown in Fig. 2, each ear 13 has an aperture 14 therein into which a light source 15, such as a bulb, is snugly fitted. Adjacent plates 11 have shields 12 of opaque material sandwiched therebetween with center portions thereof cut away so as not to interfere with the operator's vision of the lighted numerals. Projecting outwardly from and at right angles to shields 12 are lips 16 which shield adjacent plate ears 13 from stray light coming from other light sources.

Figure 3:
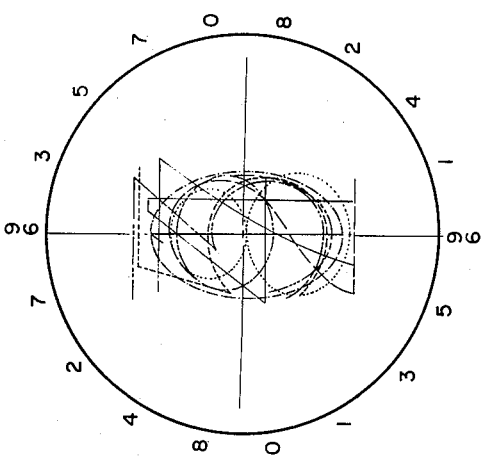
Fig. 3 shows the relationship of the superimposed numerals as they would faintly appear on the face of the indicator before any one numeral is lighted and the direction of the light source for each numeral for maximum illumination.

Fig. 3 shows the directions for the light sources for each numeral, the numerals around the edge representing the direction of light for the numeral shown. The directions are such that the light will cut the greatest number of lines in the numeral to be illuminated. For example, the light source for numeral "7" should be from the upper left, the light source for numeral "3" should be from the lower left, etc. In addition, the light sources must be spaced so as not to interfere with the lighting of other numerals. For economy in manufacture, the plates may be mass-produced by cutting or stamping from sheets with a single die. The plates are preferably circular with the ears turned to the most suitable direction of light for the particular numeral which is to be inscribed. As shown in Fig. 3, the lighting source arrangement may be from the top, bottom and one side. In this manner, the other side may be trimmed to permit the installation of a second indicator unit in close proximity with the first.

While the numerals are superimposed one behind another, so that all illuminated numerals will appear at the same place on the face of the indicator, the numerals must be so arranged that the inscribed surfaces of an unlighted numeral in front of the illuminated numeral will not interfere with the readability of the numeral illuminated. For example, if numeral "7" is in front of numeral "3," the top cross portion of "7" would tend to obscure the illumination of the top cross portion of "3." Accordingly, the position of each numeral must deviate slightly from the center of the viewing surface, as shown in Fig. 3. In the preferred embodiment, the numerals are stacked from the front to the rear of the indicator as follows: 6, 0, 8, 7, 3, 1, 5, 4, 2, and 9. "6" is placed slightly up and to the left of center, "0" is centered, "8" is down and to the left, "7" is down, "3" is up and to the left, "1" is centered, "5" is up, "4" is left, "2" is down and to the right, and "9" is down and to the right.

After the plates 11 have been cut, the ears 13 positioned and the numerals inscribed, the plates 11 and shields 12 are then stacked and positioned in the manner just described. Then holes 17 are drilled and the plate assembly is positioned behind the face block 18 by screws 19 and secured in place by nuts 20. Next, lighting elements 15 are then inserted into the apertures 14 in ears 13 on each plate, positioning the lighting filaments thereof in the plane of the ears 13. Grounding plate 21 is next positioned by screws 19, and screws 22 are adjusted to establish the electrical return connection with the lighting elements. The electrical leads 23 to each lighting element are then connected to a switch or to the desired circuits (not shown) for energizing the desired lighting elements and thus illuminate the corresponding numerals. A suitable housing (not shown) protects the various parts from exposure and damage and prevents stray lighting from interfering with the effectiveness of the indicator.

While the preferred arrangement of the plates and the positioning of the numerals have been described and shown for maximum illumination and contrast, other arrangements are possible although less effective. Also, the single ground return may be removed and conventional light bulb sockets may be used to electrically connect the various lighting elements. Different colors of transparent material may be used for the numeral plates. Different sizes and types of bulbs from neon or miniature incandescent to larger panel light bulbs may be used as lighting elements and the elements may be repositioned to permit several sets of these indicators to be placed side by side in compact arrangement in a panel. Any suitable material may be used for masking the edges of the laminated plates.

Obviously many modifications and variations of the present invention are possible in the light of the above teachings. It is therefore to be understood that within the scope of the appended claims the invention may be practiced otherwise than as specifically described.

What is claimed is:

1. A visual in-line multi-symbol signal indicator comprising a plurality of stacked plates of transparent material for internally reflecting light within said material, each plate having a numeral inscribed thereon and an individual source of light reflecting light therein through an opening in the edge thereof, said plates being superimposed one behind the other such that in facing the plates, the numerals are all superimposed and when lighted, each numeral may be read from the same geographical area on the face of said indicator.

2. A visual in-line multi-symbol signal indicator comprising a plurality of stacked plates of transparent material for internally reflecting light within said material, each plate having a symbol inscribed thereon and an individual source of light reflecting light therein through an opening in the edge thereof, said plates being superimposed one behind the other such that in facing the plates, the numerals are all superimposed and when lighted, each numeral may be read from the same geographical area on the face of said indicator, each plate having an unmasked opening at an edge thereof to receive light rays from its associated light source for lighting the numeral on said plate, and means for preventing stray light from being transmitted into said transparent plates, said means comprising masking around the edges of said plates, identically shaped shields between said plates to prevent light illuminating one plate from also illuminating adjacent plates, said shields having identical juxtapositioned apertures therein to permit viewing of all lighted numerals on plates stacked rearwardly thereof.

3. A visual in-line multi-symbol signal indicator comprising a plurality of stacked plates of transparent material for internally reflecting light within said material, each plate having a symbol inscribed thereon and an individual source of light reflecting light therein, said plates being superimposed one behind the other such that in facing the plates, the numerals are all superimposed and when lighted, each numeral may be read from the same geographical area on the face of said indicator, said individual light sources being positioned along the edge of each plate in position to give maximum lighting to the numeral described thereon, an ear on the edge of said plate in the planes thereof, with an aperture in said ear for receiving and holding said light source normal to said plane, the light filament of each light source being positioned within the plane of said ear and said plate.

4. A visual in-line multi-symbol signal indicator comprising a plurality of stacked plates of transparent material for internally reflecting light within said material, each plate having a symbol inscribed thereon and an individual source of light reflecting light therein through an opening in the edge thereof, said plates being superimposed one behind the other such that in facing the plates, the numerals are all superimposed and when lighted, each numeral may be read from the same geographical area on the face of said indicator, each of said plates having different numeral thereon, each numeral being positioned with respect to a reference line on the front face of said indicator that certain numerals appear to be centered, others appear to be positioned slightly up and to the left of center, at least one numeral appears to be slightly down and to the left of center, at least one numeral appears to be down from center, at least one numeral appears to be up from center, another numeral appears slightly left of center and other numerals appear down and to the right of center, all numerals substantially overlapping such that they all appear to be seen at the same place on the face of the indicator.

5. A visual in-line multi-symbol signal indicator comprising a plurality of stacked plates of transparent material for internally reflecting light within said material, each plate having a symbol inscribed thereon and an individual source of light reflecting light therein through an opening in the edge thereof, said plates being superimposed one behind the other such that in facing the plates, the numerals are all superimposed and when lighted, each numeral may be read from the same geographical area on the face of said indicator, said plates having the following numerals appear in the following order from front to rear of the indicator: numeral 6, numeral 0, numeral 8, numeral 7, numeral 3, numeral 1, numeral 5, numeral 4, numeral 2, and numeral 9.

6. A visual signal indicator of the type described in claim 5 in which the following numerals are superimposed such that each numeral, when lighted, appears within the same viewing area as the other numerals when lighted, and positioned with respect to a central reference point on the face of the indicator such that numeral 6 appears to be slightly up and to the left, numeral 0 is centered, numeral 8 is down and to the left, numeral 7 is slightly down, numeral 3 is slightly up and to the left, numeral 1 is centered, numeral 5 is slightly up, numeral 4 is slightly to the left, numeral 2 is down and slightly to the right, and numeral 9 is slightly down and slightly to the right.

7. A visual signal indicator of the type described in claim 3 wherein the light sources lighting numerals 3, 5, 7, and 0 are in the upper right quadrant, light sources lighting numerals 8, 2, 4, and 1 are in the lower right quadrant and numerals 9 and 6 are lighted by light sources from above and below said numerals.

8. A visual signal indicator of the type described in claim 3 wherein the light sources lighting numerals 8, 4, 2, and 7 are in the upper left quadrant, light sources lighting numerals 0, 1, 3, and 5 are in the lower left quadrant and numerals 9 and 6 are lighted by light sources from above and below said numerals.

9. A visual signal indicator of the type described in claim 1, and means for preventing stray light from one light source from lighting plates adjacent to its associated plate, said means comprising masking around the edges of said plates at points other than at said opening in said edge.

References Cited in the file of this patent

UNITED STATES PATENTS

| | | |
|---|---|---|
| 1,707,965 | Scantlebury | Apr. 2, 1929 |
| 2,142,106 | Boswau | Jan. 3, 1939 |
| 2,446,674 | Sproul | Aug. 10, 1948 |
| 2,623,313 | Fuchs | Dec. 30, 1952 |